United States Patent
Noda et al.

(10) Patent No.: US 9,889,538 B2
(45) Date of Patent: Feb. 13, 2018

(54) METHOD AND APPARATUS FOR WATER JET CUTTING

(71) Applicant: SUGINO MACHINE LIMITED, Uozu, Toyama Prefecture (JP)

(72) Inventors: Koichi Noda, Uozu (JP); Takuya Aoki, Shimoniikawa-gun (JP); Naotsugu Terasaki, Shimoniikawa-gun (JP)

(73) Assignee: SUGINO MACHINE LIMITED, Uozu (JP)

( * ) Notice: Subject to any disclaimer, the term of this patent is extended or adjusted under 35 U.S.C. 154(b) by 333 days.

(21) Appl. No.: 14/627,622

(22) Filed: Feb. 20, 2015

(65) Prior Publication Data

US 2015/0266161 A1 Sep. 24, 2015

(30) Foreign Application Priority Data

Mar. 19, 2014 (JP) ................................. 2014-055854

(51) Int. Cl.
*B24C 1/04* (2006.01)
*G05B 19/18* (2006.01)

(52) U.S. Cl.
CPC ............ *B24C 1/045* (2013.01); *G05B 19/182* (2013.01); *G05B 2219/45036* (2013.01)

(58) Field of Classification Search
CPC .................. B24C 1/045; G05B 19/182; G05B 2219/45036
USPC .................................... 88/72; 700/160; 83/72
See application file for complete search history.

(56) References Cited

U.S. PATENT DOCUMENTS

| 4,843,203 | A | * | 6/1989 | Gamo | .................... | B23H 7/065 |
| | | | | | | 219/69.12 |
| 5,605,492 | A | * | 2/1997 | Klingel | .................. | B24C 1/045 |
| | | | | | | 451/102 |
| 5,892,345 | A | * | 4/1999 | Olsen | .................. | G05B 19/237 |
| | | | | | | 318/571 |
| 6,120,351 | A | * | 9/2000 | Zeng | ....................... | B24C 1/045 |
| | | | | | | 451/2 |

(Continued)

FOREIGN PATENT DOCUMENTS

| EP | 0579841 A1 * | 1/1994 | ....... G05B 19/40937 |
| EP | 0945771 A2 * | 9/1999 | ......... G05B 19/4068 |

(Continued)

*Primary Examiner* — Kenneth M Lo
*Assistant Examiner* — Mohammed Shafayet
(74) *Attorney, Agent, or Firm* — Oliff PLC

(57) ABSTRACT

To control cutting process with cutting quality to obtain product without any uncut portion on a corner portion, and to respond to a change in cutting speed. Water jet cutting performed by: inputting a cutting program, set cutting speed, cutting parameters; calculating cutting speed matching the cutting quality; calculating cutting shape from the cutting program and dividing the cutting shape into a linear portion and a corner portion; calculating a corner cutting speed for the corner portion on the basis of a shape of the corner portion within range from the calculation cutting speed to the set cutting speed, set cutting speed equal to or higher than the calculation cutting speed; set cutting speed and the corner cutting speed to the linear portion and the corner portion, respectively, in the cutting program; moving the nozzle relative to the workpiece on the basis of the cutting program assigned with cutting speeds.

9 Claims, 10 Drawing Sheets

(56) References Cited

U.S. PATENT DOCUMENTS

| | | | | |
|---|---|---|---|---|
| 6,705,921 B1* | 3/2004 | Shepherd | B24C 1/045 | 408/180 |
| 6,766,216 B2* | 7/2004 | Erichsen | B24C 1/045 | 700/159 |
| 6,885,984 B1* | 4/2005 | Suzuki | G05B 19/4068 | 700/182 |
| 6,922,605 B1* | 7/2005 | Olsen | B23Q 1/5462 | 700/159 |
| 6,981,906 B2* | 1/2006 | Hashish | B24C 1/00 | 451/102 |
| 6,996,452 B2* | 2/2006 | Erichsen | B24C 1/045 | 700/159 |
| 7,035,708 B1* | 4/2006 | Olsen | B24C 1/045 | 409/329 |
| 7,331,842 B2* | 2/2008 | Sciulli | B23Q 17/2233 | 324/207.2 |
| 8,423,172 B2* | 4/2013 | Erichsen | B24C 1/045 | 451/102 |
| 8,525,067 B2* | 9/2013 | Muscat-Tyler | B23K 10/00 | 219/121.39 |
| 8,748,774 B2* | 6/2014 | Suzuki | B23K 26/02 | 219/121.54 |
| 2002/0066345 A1* | 6/2002 | Shepherd | B24C 1/045 | 83/53 |
| 2002/0164221 A1* | 11/2002 | Izutsu | G05B 19/4166 | 409/132 |
| 2003/0004605 A1* | 1/2003 | Hamamura | G05B 19/4163 | 700/188 |
| 2003/0065424 A1* | 4/2003 | Erichsen | B24C 1/045 | 700/281 |
| 2003/0167104 A2* | 9/2003 | Erichsen | B24C 1/045 | 700/281 |
| 2004/0048548 A1* | 3/2004 | Shepherd | B24C 1/045 | 451/2 |
| 2004/0259478 A1* | 12/2004 | Hashish | B24C 1/00 | 451/38 |
| 2006/0229761 A1* | 10/2006 | Kita | G05B 19/4068 | 700/181 |
| 2007/0037496 A1* | 2/2007 | Habermann | B24C 1/045 | 451/102 |
| 2010/0100112 A1* | 4/2010 | Kauker | A61B 17/32002 | 606/180 |
| 2011/0287692 A1* | 11/2011 | Erichsen | B24C 1/045 | 451/5 |
| 2013/0253687 A1* | 9/2013 | Erichsen | B24C 1/045 | 700/118 |

FOREIGN PATENT DOCUMENTS

| | | |
|---|---|---|
| JP | H06-45120 B2 | 6/1994 |
| JP | 5266169 B2 | 8/2013 |

* cited by examiner

FIG. 2

| CUTTING STATE | | |
|---|---|---|
| ABSOLUTE COORDINATES | REMAINING AMOUNT OF MOVEMENT | |
| X 300.00 | 123.25 | |
| Y 150.00 | 20.50 | |
| Z 20.00 | −0.13 | |
| A 3.45 | 0.25 | |
| C 5.28 | 0.04 | |
| CURRENT SPEED V | $2.0 \times 10^{-3}$ m/s | |
| CUTTING PROGRAM | | |
| G90 x 150.Y25.Z0 | | |
| G90G2 x 125.Y50.R80. | | |
| G90G3 x 120.Y25.R45. | | |
| G1 x 200.Y125.F100 | | |
| G1 x 150.Y50. | | |
| M24 | | |
| M30 | | |
| % | | |

| | | | |
|---|---|---|---|
| SET CUTTING SPEED | $V_p$ | $2.0 \times 10^{-3}$ | m/s |
| MACHINING TIME | | 125 | s |
| CALCULATION CUTTING SPEED | $V_{rv}$ | $1.6 \times 10^{-3}$ | m/s |
| CUTTING QUALITY | | 1 | |
| OPTIMUM CUTTING SPEED | $V_0$ | $1.6 \times 10^{-3}$ | m/s |
| MATERIAL COEFFICIENT | M | 0.43 | |
| CUTTING PRESSURE | P | 300 | MPa |
| MATERIAL | | PURE ALUMINUM | |
| CUTTING THICKNESS | t | 5 | mm |
| BEFORE-CORNER ACCELERATION | | 50 | m/s$^2$ |
| AFTER-CORNER ACCELERATION | | 50 | m/s$^2$ |
| ABRASIVE | | GARNET#90 | |
| ABRASIVE SUPPLY AMOUNT | $F_p$ | 0 | kg/s |

METHOD AND APPARATUS FOR WATER JET CUTTING

BACKGROUND

1. Field of the Invention

The present invention relates to a water jet cutting technology, and more particularly, to a technology for abrasive water jet cutting by means of a water jet mixed with abrasive.

2. Description of the Related Art

A jet (hereinafter referred to as the "water jet") is obtained by pressurizing water to a high pressure and forcing it through a nozzle. Then the water jet is mixed with abrasive inside the nozzle, thus producing a water jet with abrasive (abrasive water jet). The abrasive water jet is used to cut a variety of materials. Cutting by means of the abrasive water jet has characteristics that the width of the cut is small and the cutting surface is not affected by heat.

Cutting by means of the abrasive water jet (hereinafter, simply referred to as "water jet cutting") might cause inclination of the cutting surface depending on the type of material being cut (material of a workpiece) and cutting conditions.

Furthermore, when the cutting speed (relative movement speed of the nozzle to the workpiece) exceeds a predetermined speed determined by the type of material being cut and material thickness, a delay in cutting is caused. When the apex (hereinafter referred to as the "corner portion") of a curve or a polygonal line in the cutting shape is drawn under the condition of a remarkable delay in cutting, an uncut portion occurs on the surface of the workpiece far away from the nozzle.

Therefore, in order to eliminate the delay in cutting, a method is proposed in which the inclination angle of the cutting surface on a necessary side (product side) after cutting is controlled by appropriately inclining the axis of the nozzle during cutting rather than directing it perpendicular to a cutting direction (relative movement direction of the nozzle to the workpiece) (see Japanese Examined Patent Application Publication No. Hei 6-45120 and Japanese Patent No. 5266169).

The Japanese Examined Patent Application Publication No. Hei 6-45120 does not disclose a method for estimating an advance angle α and a taper correction angle β as a basis of the attitude control, and therefore the technology disclosed therein cannot be used directly as a system for automatically controlling cutting process.

Furthermore, with the technology disclosed in Japanese Patent No. 5266169, there is a need for an operator to create a new cutting program on the proposed system for changing cutting speed and adjusting cutting time. However, it takes time and effort to create a new cutting program from the cutting shape at each change in cutting speed for the purpose of obtaining the same cutting shape. Further, since such system causes many different cutting programs depending on cutting shapes and cutting parameters, it is inconvenient to arrange and store the cutting programs.

SUMMARY

Accordingly, it is a first object of the present invention to provide a method and apparatus for water jet cutting which can automatically control cutting process in accordance with desired cutting quality so as to obtain a product without any uncut portion on a corner portion and also can flexibly respond to a change in cutting speed.

Furthermore, the present inventors have conceived an idea that, preferably, a product having desired cutting quality can be obtained by automatically controlling the angle of a nozzle in accordance with cutting speed.

It is therefore a second object of the present invention to eliminate inclination of a product-side cutting surface by automatically controlling the angle (attitude) of the nozzle in accordance with an actual cutting speed.

A first aspect of the present invention provides a water jet cutting method in which a water jet mixed with abrasive is jetted from a nozzle and the nozzle is moved relative to a workpiece to cut the workpiece. The method includes the steps of: inputting a cutting program as a program for cutting process, a set cutting speed, and cutting parameters including material information of the workpiece and cutting quality; calculating a calculation cutting speed as a cutting speed matching the cutting quality on the basis of the cutting parameters; calculating a cutting shape from the cutting program and dividing the cutting shape into a linear portion and a corner portion; calculating a corner cutting speed for the corner portion on the basis of a shape of the corner portion within a range of from the calculation cutting speed to the set cutting speed, the set cutting speed being equal to or higher than the calculation cutting speed; performing assignment processing for assigning the set cutting speed and the corner cutting speed as command cutting speeds to the linear portion and the corner portion, respectively, in the cutting program; and moving the nozzle relative to the workpiece on the basis of the cutting program assigned with the command cutting speeds.

Here, the cutting quality means the quality of the cutting surface which is determined on the basis of the upper-lower difference (frontside-backside difference) in the width (cutting width) between the pair of cutting surfaces of the workpiece after cutting, the taper angle and surface roughness of the cutting surfaces or the like.

According to the first aspect of the present invention, the cutting shape is calculated from the cutting program, and an appropriate cutting speed corresponding to the shape of each corner portion of the cutting shape is assigned to the cutting program, and water jet cutting can be performed on the basis of the cutting program assigned with the cutting speed. Thus, a product matching the cutting quality without any uncut portion on the corner portion can be obtained. Further, since the cutting time depends on the input set cutting speed, if adjustment of the cutting time is desired, it is possible to easily obtain products which are the same in shape and different only in cutting time and cutting quality, by changing the input value of the set cutting speed.

That is, it is possible to provide a water jet cutting method which can automatically control cutting process in accordance with desired cutting quality so as to obtain a product without any uncut portion on a corner portion and also can flexibly respond to a change in cutting speed.

Furthermore, the material information of the workpiece may be a material name. Also, preferably, from a material table with a material coefficient corresponding to each material name recorded [s3], a value of the material coefficient corresponding to the input material name is retrieved and read to be used for calculation of the calculation cutting speed.

With this constitution, because the material name of the workpiece is input and the material coefficient is read from the material table, the input operation is facilitated.

Moreover, preferably, a certain number of blocks ahead of a block currently being executed in the cutting program are read and the assignment processing is performed sequentially for each of the read blocks.

With this constitution, even when a very long cutting program is given, a cutting speed is assigned to each of a certain number of blocks ahead of the block currently being executed, thereby reducing the burden of the assignment processing of the corner cutting speed and shortening the total operation time.

Further, processing for changing the set cutting speed to the same value as the calculation cutting speed is preferably performed.

With this constitution, the optimum cutting speed corresponding to the cutting parameters including material information of the workpiece is automatically calculated, and a product can be obtained by using the calculation result. In the water jet cutting, the quality of the cutting surface varies depending on various cutting parameters, and therefore it is difficult to obtain a product of desired cutting quality. However, with this constitution, a product of desired cutting quality can be easily obtained by inputting cutting parameters, such as cutting quality and material information of the workpiece, and a cutting program.

Also, preferably, the cutting quality includes information about an inclination angle of a product-side cutting surface of a pair of cutting surfaces of the workpiece after cutting. The water jet cutting method may further include the steps of: detecting a cutting speed as a speed of relative movement of the nozzle to the workpiece; estimating a taper angle of the pair of cutting surfaces on the basis of the detected cutting speed, the calculation cutting speed for minimizing the taper angle of the pair of cutting surfaces of the workplace after cutting, and the cutting parameters; and calculating an angle correction amount of a nozzle attitude for keeping the inclination angle of the product-side cutting surface of the pair of cutting surfaces of the workpiece within a specified range. Also, preferably, the angle correction amount is added to the amount of relative movement of the nozzle to the workpiece based on the cutting program to move the nozzle relative to the workpiece.

With this constitution, inclination of the product-side cutting surface can be eliminated by estimating a taper angle of the pair of cutting surfaces under the current cutting speed and inclining the nozzle in accordance with the estimated taper angle. Here, the nozzle is always kept in the optimum attitude regardless of the input set cutting speed and cutting shape, thereby eliminating the inclination of one (product-side) cutting surface of the two cutting surfaces occurring at the time of cutting the workpiece.

Furthermore, the inclination angle of the product-side cutting surface is kept in a specified range by inclining the nozzle, thereby allowing cutting at a higher cutting speed, as compared with the speed for keeping the taper angle of the pair of cutting surfaces within a certain range without inclining the nozzle.

A second aspect of the present invention provides a water jet cutting apparatus including: a movement mechanism that relatively moves a nozzle and a workpiece; a high-pressure water supply mechanism that supplies high-pressure water to the nozzle; an abrasive supply mechanism that supplies abrasive to the nozzle; and a control device for the movement mechanism. The movement mechanism moves on the basis of a position command received from the control device. The controller includes: an input unit, a memory unit, a calculation unit, and a communication unit. The input unit is configured to input a cutting program as a program for cutting process, a set cutting speed, and cutting parameters including material information of the workpiece and cutting quality. The memory unit stores the cutting program, a calculation program for determining a cutting speed as a speed of relative movement of the nozzle to the workpiece, and a cutting program assigned with the cutting speed. The calculation unit stores the cutting parameters in the memory unit; calculates the calculation cutting speed as a cutting speed matching the cutting quality on the basis of the cutting parameters; calculates a cutting shape from the cutting program; dividing the cutting shape into a linear portion and a corner portion; calculates a corner cutting speed for the corner portion on the basis of a shape of the corner portion within a range of from the calculation cutting speed to the set cutting speed, the set cutting speed being equal to or higher than the calculation cutting speed; assigns the set cutting speed and the corner cutting speed as command cutting speeds to the linear portion and the corner portion, respectively, in the cutting program; and creates the position command on the basis of the cutting program assigned with the command cutting speeds. The communication unit sends the position command to the movement mechanism.

According to the second aspect of the present invention, the calculation unit calculates the cutting shape from the cutting program, and assigns an appropriate cutting speed corresponding to the shape of each corner portion of the cutting shape to the cutting program, thereby allowing water jet cutting on the basis of the cutting program assigned with the cutting speed. Thus, a product matching the cutting quality without any uncut portion on the corner portion can be obtained. Further, since the cutting time depends on the input set cutting speed, if adjustment of the cutting time is desired, it is possible to easy obtain products which are the same in shape and different only in cutting time and cutting quality, by changing the input value of the set cutting speed.

That is, it is possible to provide a water jet cutting apparatus which can automatically control cutting process in accordance with desired cutting quality so as to obtain a product without any uncut portion on a corner portion and also can flexibly respond to a change in cutting speed.

Furthermore, the material information of the workpiece may be a material name. Preferably, the memory unit stores a material table with a material coefficient corresponding to each material name recorded [s3]. Preferably, the calculation unit retrieves and reads a value of the material coefficient corresponding to the input material name from the material table, and uses the value for calculation of the calculation cutting speed.

Also, preferably, the calculation unit performs processing for changing the set cutting speed to the same value as the calculation cutting speed.

Also, preferably, the cutting quality includes information about an inclination angle of a product-side cutting surface of a pair of cutting surfaces of the workpiece after cutting. The movement mechanism may further include a detection mechanism that detects a cutting speed as the speed of relative movement of the nozzle to the workpiece. The communication unit preferably receives the cutting speed. The calculation unit preferably estimates a taper angle of the pair of cutting surfaces on the basis of the received cutting speed, the calculation cutting speed for minimizing the taper angle of the pair of cutting surfaces of the workpiece after cutting, and the cutting parameters; calculates an angle correction amount of a nozzle attitude for keeping the inclination angle of the product-side cutting surface of the pair of cutting surfaces of the workpiece within a specified range; calculates a position command correction amount corresponding to the angle correction amount; and incorporates the position command correction amount into the position command.

According to the aspects of the present invention, it is possible to provide a method and apparatus for water jet cutting which can automatically control cutting process in accordance with desired cutting quality so as to obtain a product without any uncut portion on a corner portion and also can flexibly respond to a change in cutting speed.

BRIEF DESCRIPTION OF THE DRAWINGS

Embodiments of the present invention will be described in detail based on the following drawings, in which:

FIG. 2 shows a cutting state display screen according to the first embodiment of the present invention;

FIGS. 6A and 6B show cutting speed at a corner portion according to the first embodiment of the present invention, wherein FIG. 6A shows a cutting shape of an apex and FIG. 6B shows the cutting speed at the corner portion with respect to distances before and behind the apex;

FIGS. 7A and 7B show the assignment of cutting speeds in the case where arcuate corner portions are continuously formed according to the first embodiment of the present invention, wherein FIG. 7A shows a cutting shape and FIG. 7B shows cutting speed with respect to cutting distance;

FIGS. 8A and 8B show the assignment of cutting speeds in the case where arcuate corner portions are continuously formed according to the first embodiment of the present invention, wherein FIG. 8A shows a cutting shape and FIG. 8B shows cutting speed with respect to cutting distance;

DETAILED DESCRIPTION

First Embodiment

<Configuration of Water Jet Cutting Apparatus>

Figure 1:
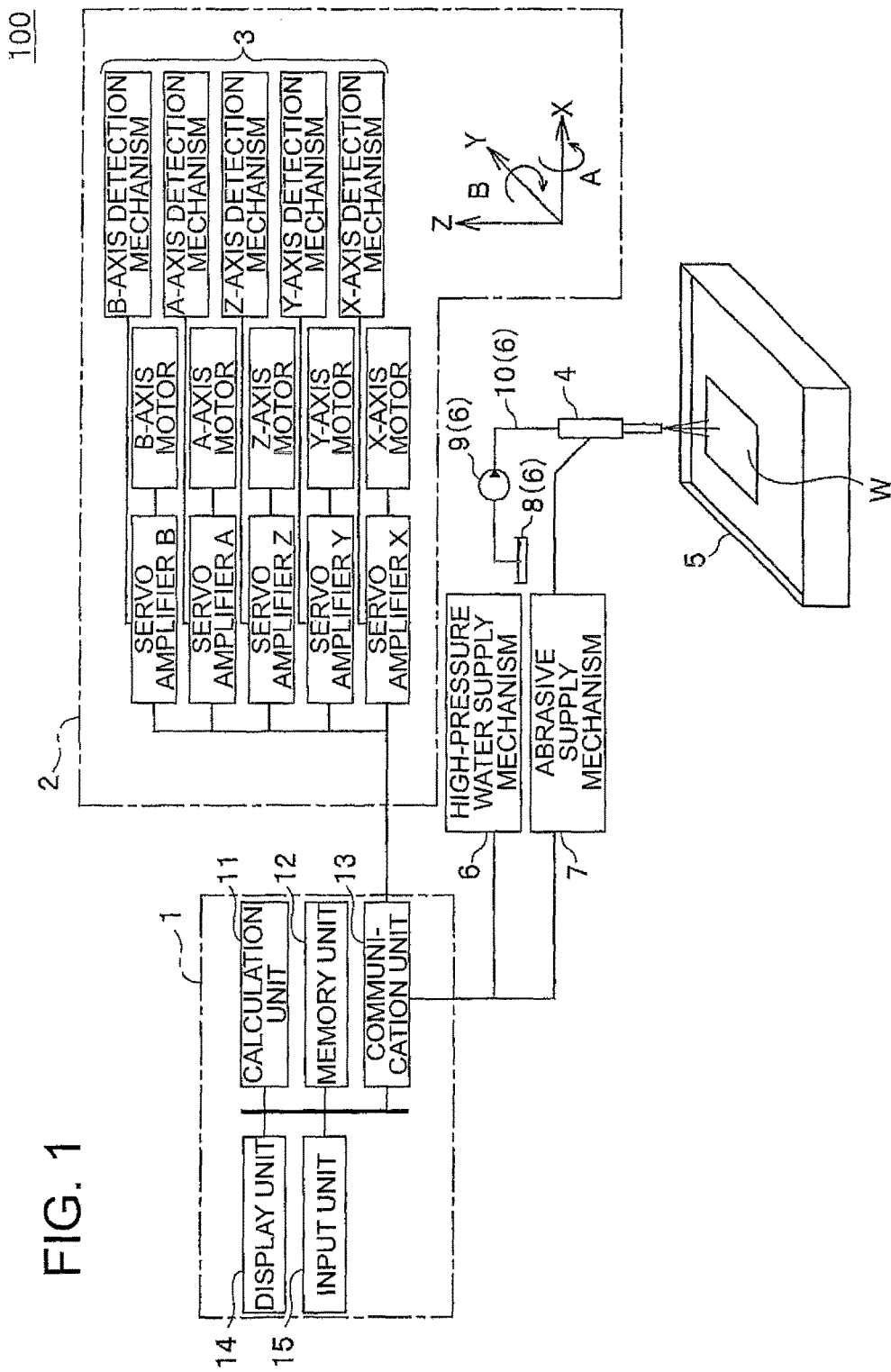
FIG. 1 shows the overall configuration of a water jet cutting apparatus according to a first embodiment of the present invention.

The configuration of a water jet cutting apparatus 100 will be described with reference to FIG. 1.

The water jet cutting apparatus 100 includes: a nozzle 4; a high-pressure water supply mechanism 6 that supplies high-pressure water to the nozzle 4; an abrasive supply mechanism 7 that supplies abrasive to the nozzle 4; a movement mechanism 2 that relatively moves the nozzle 4 and a workpiece W; and a control device 1.

The workpiece W is disposed between a catcher 5 and the nozzle 4. The movement mechanism 2 moves the nozzle 4 or the workpiece W. The nozzle 4 is moved relative to the workpiece W by the movement mechanism 2. Examples of the movement mechanism 2 may include a gate-shaped device with a gate-shaped XYZ movement mechanism having one or more angular axes, a vertical articulated robot, a horizontal articulated robot and other movement mechanisms.

The catcher 5 is a tank-type catcher. The workpiece W is fixed on the catcher 5, and the nozzle 4 is fixed to the movement mechanism 2 disposed above the catcher 5. The nozzle 4 is moved with respect to the fixed workpiece W above the workpiece W. Here, the movement mechanism 2 is a gate-shaped movement mechanism that is controlled with five axes, namely, X, Y, and Z linear axes, which are placed perpendicular to one another, and A and B rotational axes, and is numerically controlled. The movement mechanism 2 includes a servomotor (motor for each axis shown in FIG. 1) that drives each axis and a servo amplifier that sends a drive pulse to the corresponding servomotor on the basis of a position command sent from the control device 1. The servomotor has a detection mechanism 3 inside, which is an encoder. The detection mechanism 3 sends the rotational speed and angle of the servomotor to the servo amplifier for performing feedback control and sends a current cutting speed to the control device 1.

It should be noted that although in this embodiment, the gate-shaped movement mechanism is used as the movement mechanism 2, a cantilever movement mechanism, a vertical articulated movement mechanism, or a horizontal articulated movement mechanism may be used. Furthermore, the arrangement may be such that the workpiece W moves along one or more axes of the X, Y, and Z axes.

Further, the detection mechanism 3 is unnecessary if the motor for the movement mechanism 2 is not the servomotor and feedback control is not performed.

The high-pressure water supply mechanism 6 includes a water tank 8, a high-pressure pump 9, and a high-pressure pipe 10 that supplies high-pressure water from the high-pressure pump 9 to the nozzle 4. Here, the high-pressure water supply mechanism 6 includes a valve (not shown) for shutting off high-pressure water, and the start and stop of supply of high-pressure water can be adjusted by the control device 1. Also, the pressure of high-pressure water generated by the high-pressure pump 9 can be adjusted by the control device 1. In this case, the state of the high-pressure water supply mechanism 6 can be automatically controlled by the control device 1 by inputting a pressure, jetting timing, and stop timing to a cutting program that is a program for cutting process.

The high-pressure pump 9 pressurizes water stored in the water tank 8 to a predetermined cutting pressure in the range of about 100 to 700 MPa. Then the pressurized high-pressure water is supplied to the nozzle 4 through the high-pressure pipe 10. The high-pressure water discharged as a jet from the nozzle 4 absorbs abrasive supplied from the abrasive supply mechanism 7, and the high-pressure jet with the abrasive impinges upon the workpiece W to wear away the workpiece W. Because the nozzle 4 is moved relative to the workpiece W, the above-described jet wears away the workpiece W with the relative movement of the nozzle 4 and reaches the back side of the workpiece W to cut the workpiece W.

The abrasive supply mechanism 7 stores abrasive and supplies the abrasive to the nozzle 4 at a predetermined flow rate. As the abrasive supply mechanism 7, a hopper capable of adjusting internal pressure using pressurized air is used. Preferably, the amount of supply of the abrasive can be adjusted by the control device 1. The abrasive discharged from the abrasive supply mechanism 7 is mixed with a high-pressure jet in the nozzle 4 that discharges high-pressure water. The high-pressure water and abrasive discharged from the nozzle 4 are received by the catcher 5 and, with dynamic pressure lost, discharged from the water jet cutting apparatus 100.

The control device 1 will be described. The control device 1 is composed of a calculation unit 11, a memory unit 12, a display unit 14, an input unit 15, and a communication unit 13.

The calculation unit 11 reads cutting parameters (parameters for cutting process), an operation expression, etc. from the memory unit 12. Then, on the basis of those numerical values and the operation expression, the calculation unit 11 assigns a cutting speed (relative movement speed of the nozzle 4 to the workpiece W) to a cutting program and encodes (creates a position command) the cutting program assigned with the cutting speed, and sends the position command to the movement mechanism 2 through the communication unit 13. The function of the calculation unit 11 will be described later in detail.

As the memory unit 12, a hard disk drive (HDD), a dynamic random access memory (DRAM), or a flash memory is used. The memory unit 12 stores a material table to be described later, an instruction set of the movement mechanism 2, and an input cutting program. Here, the instruction set includes an instruction set (for example, a M code command) for giving pressure instructions and jetting or stop instructions to the high-pressure water supply mechanism 6 in addition to a program (for example, a G code command) for giving instructions to the movement mechanism 2.

The input unit 15 includes at least one of a keyboard, a mouse, and a dial. An operator inputs from the input unit 15 a cutting program, or a set cutting speed $V_p$, a cutting thickness t, a cutting allowable angle, a cutting pressure P, an abrasive supply amount $F_p$, a material name and other cutting parameters.

It should be noted that the operator may input an externally-created cutting program or the like through the communication unit 13 in place of inputting the cutting program or the like from the input unit 15.

The input values are stored in the memory unit 12.

The display unit 14 is a liquid crystal panel including a graphical user interface (GUI). As will be described later, the display unit 14 displays an input cutting program, cutting parameters, a remaining amount of movement, which corresponds to the amount of movement from a current position to the completion of the movement of the nozzle 4 in a block currently being executed in the cutting program, a cutting speed and the like. It should be noted that a touch-sensitive display unit also having the function as the input unit 15 may be used as the display unit 14.

The communication unit 13 includes an I/O port and transmits or receives data to or from the movement mechanism 2, the high-pressure water supply mechanism 6, and the abrasive supply mechanism 7. The communication unit 13 can also include various communication ports, such as the Ethernet (R) port, an optical connector, a universal serial bus (USB) port, and a PC card drive, for executing data communication with external equipment. Through these communication ports, the cutting parameters and cutting program can be input or output.

The communication unit 13 transmits a position command to each of the servo amplifiers. The servo amplifier sends a driving pulse train to the corresponding servomotor on the basis of the position command sent from the communication unit 13 and causes the servomotor to rotate for movement in the direction of the corresponding axis. Furthermore, the encoder as the detection mechanism 3 transmits a current cutting speed in the direction of the corresponding axis to the communication unit 13 through the servo amplifier, and the communication unit 13 receives the current cutting speed.

Here, the position command is a pulse train, which is transmitted from the communication unit 13 to the servo amplifier and then, after received by the servo amplifier, disappears. The pulse train cannot be recognized from the outside and also cannot be taken out. In this regard, it is fundamentally different from the command, such as the cutting program, stored and reused in human-readable form.

<Screen Display>

Next, the screen display will be described.

A cutting state display screen (FIG. 2) displays a cutting program not including a cutting speed (F code command), current coordinates in an absolute coordinate system (work coordinate system), a remaining amount of movement, and a current cutting speed (current speed). The current coordinates are actual nozzle coordinates, which show an actual nozzle position including correction, such as tool diameter correction. As the coordinate system for displaying the current coordinates, a relative coordinate system and a machine coordinate system are available in addition to the absolute coordinate system. The relative coordinate system shows a relative position from a certain position. The machine coordinate system shows a distance from the coordinate origin with machine zero as the coordinate origin. An operator can switch the coordinate system for displaying the current coordinates as necessary.

It should be noted that, if the input cutting program includes a cutting speed, the calculation unit 11 replaces the cutting speed of the cutting program by a calculated cutting speed on the basis of the function to be described later.

The display unit 14 further displays current cutting speed (current speed) V [m/s]. The current speed V is the actual cutting speed detected by the detection mechanism 3 included in the movement mechanism 2.

Also, the display unit 14 displays input values of cutting pressure P [MPa], material coefficient M, cutting thickness t [mm], cutting quality, abrasive supply amount $F_p$ [kg/s], optimum cutting speed $V_o$, before-corner acceleration, after-corner acceleration, and set cutting speed $V_p$, and a calculation value of calculation cutting speed $V_{rv}$ [m/s] or the like.

It should be noted that the calculation cutting speed $V_{rv}$ is displayed as a reference for the input of the set cutting speed $V_p$. In this embodiment, corner portions are cut at corner cutting speed $V_c$ assigned on the basis of the calculation cutting speed $V_{rv}$ automatically calculated, thereby performing reliable cutting of the corner portions. On the other hand, at linear portions, the nozzle 4 is moved at the set cutting speed $V_p$, and therefore, when the set cutting speed $V_p$ is too high, there are cases where target cutting quality cannot be obtained. The display of the calculation cutting speed $V_{rv}$ serves as a reference for the input of the set cutting speed $V_p$ and has the advantage to make easy obtaining of more desirable cutting quality.

<Movement Mechanism>

Figure 3:
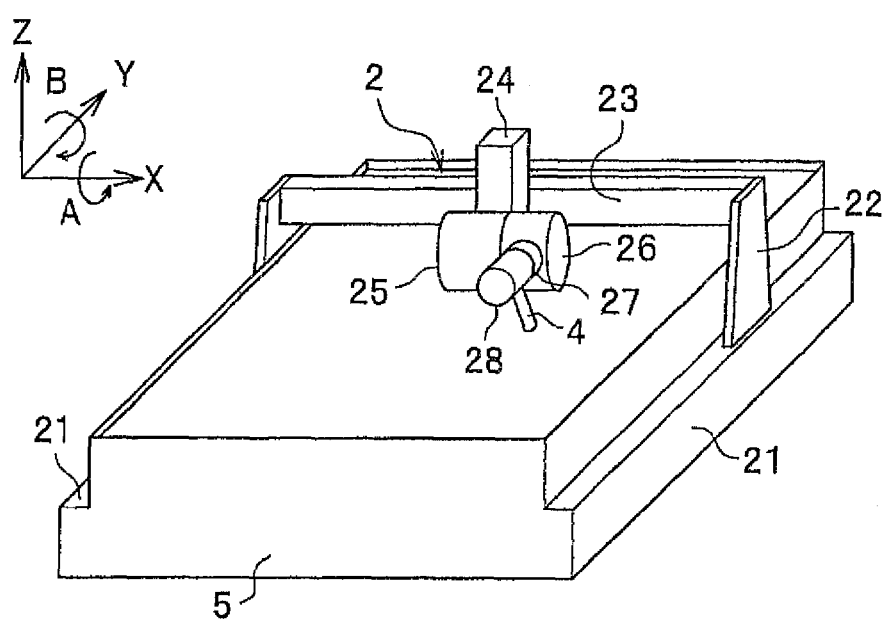
FIG. 3 shows a movement mechanism according to the first embodiment of the present invention.

The movement mechanism 2 will be described with reference to FIG. 3.

A pair of parallel linear motion devices (Y-axis device) 21 are disposed in a horizontal direction on left and right sides of the catcher 5 and provided with a Y-saddle 22 moving on the Y-axis device 21. A linear motion device (X-axis device) 23 is disposed in the horizontal direction perpendicular to the Y-axis on the Y-saddle 22. A linear motion device (Z-axis device) 24 is disposed in a vertical direction on an X-saddle, the X-saddle being movable on the X-axis device 23. An A-axis device 25 having a rotational axis parallel to the X-axis is provided on a Z-saddle, the Z-saddle moving on the Z-axis device 24. B-axis device 27 having a rotational axis parallel to the Y-axis is provided on an A-saddle 26, the A-saddle 26 rotating about the rotational axis of the A-axis device 25. The nozzle 4 is disposed on a B-saddle 28, the B-saddle 28 rotating about the rotational axis of the 3-axis device 27. A linear shaft of each of the X-axis device 23, the Y-axis device 21, and the Z-axis device 24 is linearly moved by a ball screw mechanism. A rotating shaft of each of the A-axis device 25 and the B-axis device 27 is driven directly by the corresponding servomotor or through a toothed belt or a gear.

It should be noted that a rack-and-pinion mechanism, a linear motor mechanism and other linear motion mechanisms may be used as the linear shaft in place of the ball screw mechanism.

<Acceleration at Corner Portion>

The calculation unit 11 causes the nozzle 4 to move along a cutting path assumed by the cutting program. Furthermore, the calculation unit 11 automatically calculates cutting speed (corner cutting speed $V_c$) of each corner portion in accordance with the shape (cutting shape) of the cutting path and assigns it to the cutting program for acceleration control. The calculation unit 11 appropriately assigns the corner cutting speed $V_c$ to each corner portion, thereby providing a cutting result corresponding to a predetermined quality level. Here, the corner portion refers to a portion of the shape of the cutting path other than the linear portion and, in particular, to an arcuate portion or the apex portion of a polygonal line. In the description below, the arcuate portion is referred to as the arcuate corner portion, and the apex portion of the polygonal line is referred to as the apex corner portion.

Figure 4:
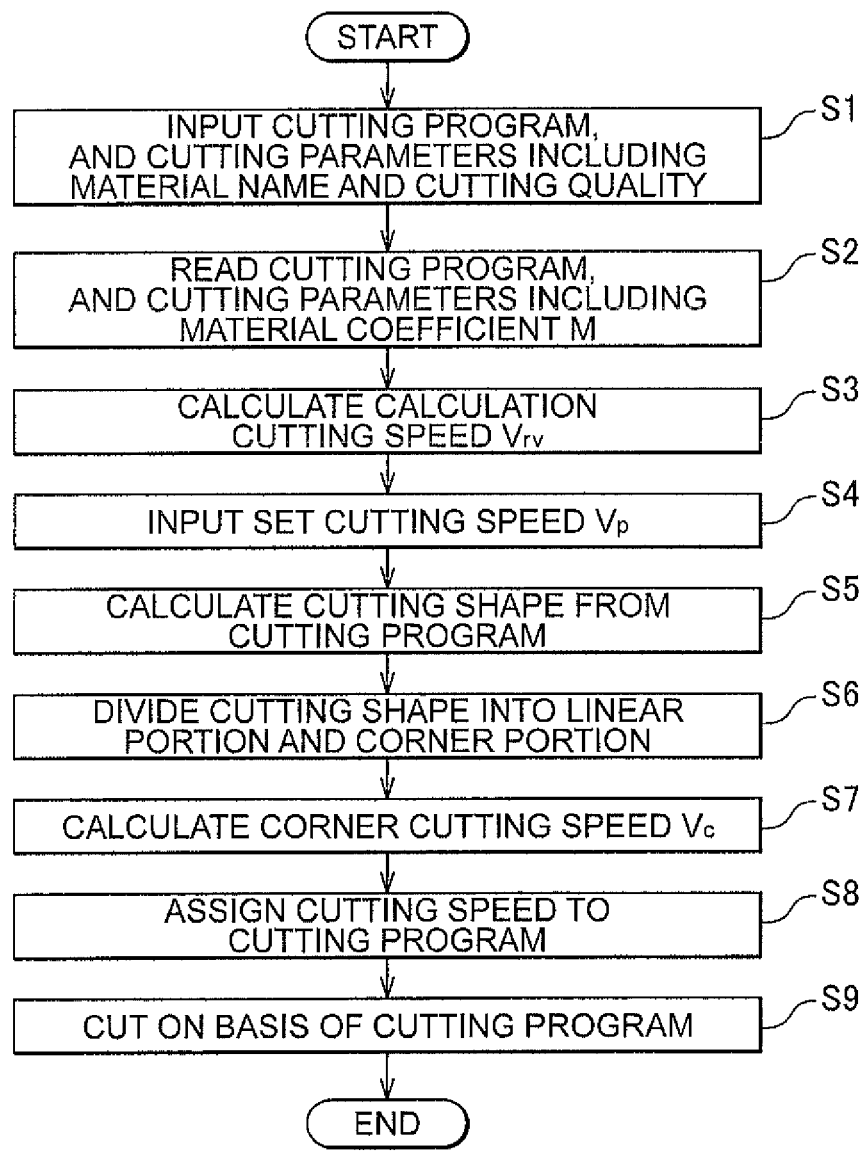
FIG. 4 is a flowchart for the procedure of a cutting method according to the first embodiment of the present invention.

A cutting method will be described with reference to FIG. 4. An operator inputs, using the input unit 15, a cutting program, and cutting parameters including a material name and cutting quality (step S1). The input numerical values, etc. are stored in the memory unit 12 and displayed on the display unit 14. The calculation unit 11 reads the cutting program and the cutting parameters including material coefficient M from the memory unit 12 (step S2). Here, in the step S2, the calculation unit 11 retrieves and reads the material coefficient M corresponding to the material name from the material table stored in the memory unit 12. The calculation unit 11 calculates calculation cutting speed $V_{rv}$ matching the cutting quality on the basis of the read numerical values (step S3). Because the material name of the workpiece W is input and the material coefficient M is read from the material table in this manner, the input operation is facilitated. Further, the operator inputs set cutting speed $V_p$ using the input unit 15 (step S4). Here, the input set cutting speed $V_p$ is stored in the memory unit 12 and displayed on the display unit 14, and the calculation unit 11 reads the set cutting speed $V_p$ from the memory unit 12. It should be noted that the operator can input the set cutting speed $V_p$ at any time during the process of the steps S1 to S4 and further, the data once input can be input again. Furthermore, the calculation unit 11 calculates a cutting shape from the cutting program (step S5). Then the calculation unit 11 divides the calculated cutting shape into the linear portion and the corner portion (step S6). On the basis of the shape of each corner portion divided out of the calculated cutting shape, the calculation unit 11 calculates corner cutting speed $V_c$ matching the shape of the corner portion and the cutting quality (step S7). Subsequently, the calculation unit 11 assigns appropriate cutting speed to each block in the cutting program (step S8). Further, the calculation unit 11 creates a position command based on the cutting program assigned with the cutting speed and sends the position command to the movement mechanism 2 thorough the communication unit 13. Then the movement mechanism 2 moves the nozzle 4 in accordance with the position command, and the workpiece W is cut by water jets discharged from the nozzle 4 (step S9).

It should be noted that in the step S1, the operator can input the material coefficient M, in place of the material name, to the control device 1 through the input unit 15. It should be also noted that the calculation unit 11 may input a timing for the supply of high-pressure water or abrasive to the cutting program using a predetermined instruction set (for example, the M code command). Alternatively, the timing for the supply of high-pressure water or abrasive may be preliminarily input to the cutting program. In these cases, the calculation unit 11 gives a supply command to the high-pressure water supply mechanism 6 or the abrasive supply mechanism 7 through the communication unit 13 in accordance with the cutting program.

Figure 5:
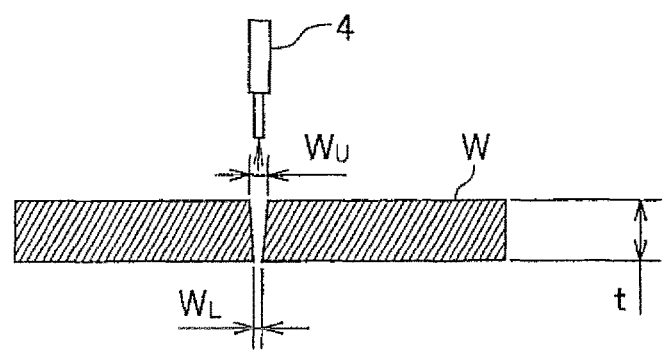
FIG. 5 is a sectional view of a cutting surface according to the first embodiment of the present invention.

The inclination of a cutting surface to a vertical axis will be described with reference to FIG. 5. In the case of cutting of the workpiece W by means of water jets, the cutting surface might be inclined. The angle of such inclination is referred to as the taper angle. In the water jet cutting, the cutting speed not causing inclination of the cutting surface varies depending on the cutting parameters including cutting thickness t. The cutting speed at which the taper angle of the cutting surface is negligible, that is, the taper angle is nearly zero (minimized), is referred to as the optimum cutting speed $V_o$. In general, when the cutting speed is lower than the optimum cutting speed $V_o$, lower-surface cutting width $W_L$ becomes greater than upper-surface cutting width $W_U$. On the contrary, when the cutting speed exceeds the optimum cutting speed $V_o$, the upper-surface cutting width $W_U$ becomes greater than the lower-surface cutting width $W_L$. Furthermore, the difference between the upper-surface cutting width $W_U$ and the lower-surface cutting width $W_L$ is referred to as the upper-lower difference in cutting width.

In this embodiment, the cutting quality means the upper-lower difference (frontside-backside difference) in the width (cutting width) between the pair of cutting surfaces of the workpiece W after cutting. The target cutting quality of the cutting portion is classified into, for example, the following three levels of quality, arranged in ascending order of the upper-lower difference in cutting width (in descending order of quality): cutting quality 1, cutting quality 2, and cutting quality 3. Here, the cutting quality 1 is the cutting quality where the upper-lower difference in cutting width is nearly zero. The cutting quality 2 is the cutting quality where, although there are some upper-lower differences in cutting width, they are tolerable for most purposes. Further, the cutting quality 3 is the minimum cutting quality given for the maximum speed required to cut the workpiece W without regard to cutting width. Cutting quality coefficient Q is a coefficient that is set in accordance with the cutting quality and used for calculating the calculation cutting speed $V_{rv}$ to be described later. In this embodiment, the calculation cutting speed $V_{rv}$ for the cutting quality 1 is set as the optimum cutting speed $V_o$.

It should be noted that the surface roughness or taper angle of the cutting surface may be used as the cutting quality. It should be also noted that, in the case of using the upper-lower difference in cutting width as the cutting quality, any method for substituting the numerical value range of the upper-lower difference for the cutting quality is usable regardless of the form thereof.

The calculation cutting speed $V_{rv}$ [m/s] is the cutting speed matching the cutting quality, and in this embodiment, corresponds to the maximum cutting speed given in accordance with the cutting quality. The calculation cutting speed $V_{rv}$ is calculated by the following equation (1), where M represents a material coefficient; Q, a cutting quality coefficient; t, a cutting thickness; P, a jet pressure (MPa); $F_p$, an abrasive supply amount (kg/s); $d_A$, an abrasive nozzle diameter (mm); and $d_W$, a water nozzle diameter (mm).

[FORMULA 1]

$$V_{rv} = f(M, Q, t, P, F_p) f(d_A, d_W) \quad (1)$$

It should be noted that the relationship between the cutting parameters, including cutting quality, and the calculation cutting speed $V_{rv}$ is given by the mathematical formula, but also can be given by a correlation table between the cutting parameters, such for example as the cutting quality and the material (cutting material) of the workpiece W, and the calculation cutting speed $V_{rv}$, in place of the mathematical formula. This correlation processing need only have the function of giving an appropriate cutting speed matching the cutting parameters, such as the cutting quality and the cutting material.

The calculation cutting speed $V_{rv}$ may be given by an optional numerical value input by an operator in place of the above-described automatic calculation method. For example, the numerical value estimated by automatic calculation is displayed on the display unit 14, and the operator may input an optional numerical value referring to that numerical value.

The material coefficient M is listed in the material table. The material table is given as TABLE 1.

TABLE 1

MATERIAL TABLE

| MATERIAL NAME | MATERIAL COEFFICIENT M |
|---|---|
| PURE ALUMINUM | 0.43 |
| AUSTENITIC STAINLESS STEEL | 0.097 |
| ... | ... |
| ... | ... |

It should be noted that the material coefficient M may be directly entered in place of the method of inputting a material name and retrieving the material coefficient M corresponding to the material name from the material table. In this case, when cutting is performed relying on the material coefficient M in the material table and the resultant cutting quality deviates from the desired cutting quality, the cutting quality can be changed directly by entering another material coefficient $M_1$.

Alternatively, the material coefficient M can be changed indirectly by entering a relative proportion, such as a percentage or permillage, to a numerical value on the material table. In this case, the material coefficient M is the value obtained by multiplying the numerical value on the table by the proportion entered.

The calculation of a cutting shape will be described. The calculation unit 11 calculates a cutting shape of a cutting path from the cutting program on the basis of an instruction set (for example, a G code command) of the cutting program. This cutting shape means the shape of the path to be cut by the input cutting program.

It should be noted that, in place of calculating the cutting shape over the entire region of the cutting program, the calculation unit 11 may read the cutting program in advance for a plurality of blocks ahead of the block currently being cut (executed) by the movement mechanism 2 out of the cutting program and calculate the shape of only the portion to be out from the present to the near future. Furthermore, a certain number of blocks ahead of the block currently being executed in the cutting program are read, and assignment processing for assigning cutting speed to the cutting program as described later may be performed sequentially for each of the read blocks. With this constitution, even when a very long cutting program is given, a cutting speed is assigned to each of a certain number of blocks ahead of the block currently being executed, thereby reducing the burden of the assignment processing of the corner cutting speed and shortening the total operation time.

The assignment of cutting speed to the cutting program will be described with reference to FIGS. 6A to 8B. When the cutting shape includes the apex of a polygonal line or an arc (corner portion), the calculation unit 11 assigns corner cutting speed $V_c$ to the block in the cutting program which corresponds to the corner portion, and performs control of acceleration[s1] in the portions connected to the apex or the arc.

The calculation unit 11 causes the nozzle 4 to undergo linear deceleration from a portion spaced a before-corner acceleration distance[s2] $L_{B1}$ immediately before entry into the apex corner portion (see FIG. 6) to the corner portion, move through the corner portion at the cutting speed (corner cutting speed $V_c$) for the corner portion, and undergo linear acceleration up to a point spaced an after-corner acceleration distance $L_{A1}$ immediately after exit from the corner portion.

As for the portions before and after the corner portion where acceleration control is performed, the calculation unit 11 may subdivide the cutting program into smaller pieces and assign cutting speeds by stages to the cutting programs. In this case, the display unit 14 preferably displays the originally-input cutting program rather than displaying the cutting programs created by the subdivision. This allows the operator to easily confirm the contents of the input cutting program and keep track of a cutting state.

The operator inputs a before-corner acceleration and an after-corner acceleration to the control device 1 through the input unit 15.

It should be noted that the acceleration values corresponding to the cutting material may be defined in the material table. In this case, the acceleration values read from the material table corresponding to the material name are temporarily stored in the memory unit 12 and can be utilized.

It should be noted that the before-corner acceleration distance may be input in place of the before-corner acceleration and the after-corner acceleration distance may be input in place of the after-corner acceleration. In this case, the value obtained by dividing the difference between the set cutting speed $V_p$ and the calculation cutting speed $V_{rv}$ by the before-corner acceleration distance or the after-corner acceleration distance can be used as the before-corner acceleration or the after-corner acceleration.

The corner cutting speed $V_c$ to be assigned to each corner portion is calculated in accordance with the set cutting speed $V_p$ and the calculation cutting speed $V_{rv}$. The corner cutting speed $V_c$ decreases with more rapid change in the shape of the corner portion, and, when meeting certain criteria indicating the rapid change, is the same as the calculation cutting speed $V_{rv}$. Furthermore, the corner cutting speed $V_c$ increases with more gentle change in the shape of the corner, and, when meeting certain criteria indicating the gentle change, is the same as the set cutting speed $V_p$. The corner cutting speed $V_c$ is a value intermediate between the set cutting speed $V_p$ and the calculation cutting speed $V_{rv}$.

As for the apex corner portion, control is performed on the basis of an apex angle φ. The apex angle φ is given as the difference between advancing angles (angles in the traveling direction) before and after the apex (see FIG. 6A). The greater the apex angle φ, the lower the corner cutting speed $V_c$. And the smaller the apex angle φ, the higher the corner cutting speed $V_c$.

It should be noted that the corner cutting speed $V_c$ may be always the calculation cutting speed $V_{rv}$ or the optimum cutting speed $V_o$ regardless of the corner shape.

Figure 6A:
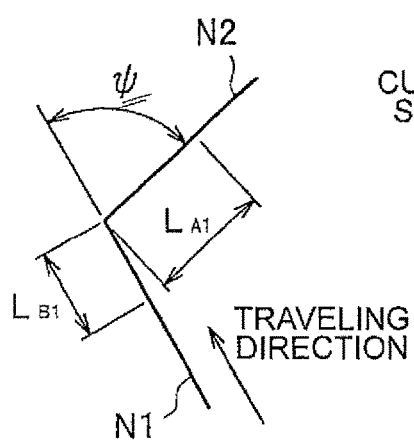
Figure 6B:
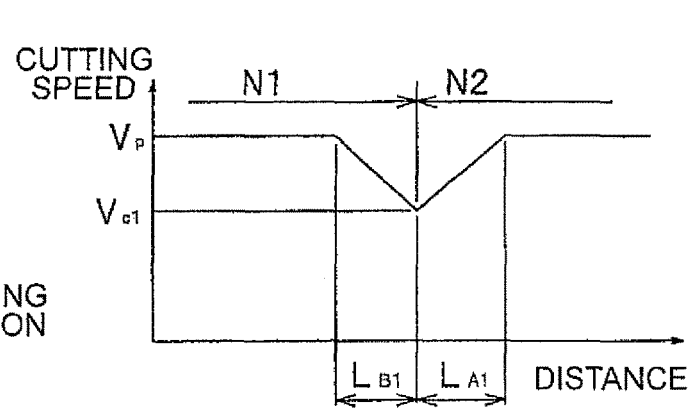

The assignment of speed will be described with reference to FIG. 6B. In a block N1, which is a linear portion immediately before the apex corner portion, the nozzle 4 is moved at the set cutting speed $V_p$ until immediately before the before-corner acceleration distance $L_{B1}$ in the vicinity of the corner portion. Then the nozzle 4, in the section of the before-corner acceleration distance $L_{B1}$, slows down with the before-corner acceleration, and reaches the apex at a corner cutting speed $V_{c1}$. After passing through the apex portion, the nozzle 4 enters a block N2. In the block N2, the nozzle 4 initially speeds up with the after-corner acceleration, and moves forward the after-corner acceleration distance $L_{A1}$ to reach the set cutting speed $V_p$. Then the nozzle 4 cuts the rest of the block N2 at the set cutting speed $V_p$.

It should be noted that processing for changing the set cutting speed $V_p$ to the same value as the calculation cutting speed $V_{rv}$ can be performed. In this case, the calculation cutting speed $V_{rv}$ is assigned to the cutting speed for the linear portion in place of the set cutting speed $V_p$. In this case, it is unnecessary to input the set cutting speed $V_p$. Furthermore, the optimum cutting speed corresponding to the cutting parameters including material information of the workpiece W is automatically calculated, and a product can be obtained by using the calculation result. In the water jet cutting, the quality of the cutting surface varies depending on various cutting parameters, and therefore it is difficult to obtain a product of desired cutting quality. However, a product of desired cutting quality can be easily obtained by inputting cutting parameters, such as cutting quality information and material information of the workpiece W, and a cutting program in this manner. That is, all cutting speeds are automatically calculated, thereby allowing an operator having little knowledge or experience of water jet cutting to perform cutting in accordance with the conditions suitable for the cutting quality.

Acceleration in the arcuate corner portion will be described with reference to FIGS. 7A and 7B. The corner cutting speed $V_c$ in the arcuate corner portion is calculated on the basis of arc radiuses $R_A$ and $R_B$. That is, the smaller the arc radiuses $R_A$ and $R_B$, the lower the corner cutting speed $V_c$. And the larger the arc radiuses $R_A$ and $R_B$, the higher the corner cutting speed $V_c$.

Figure 7A:
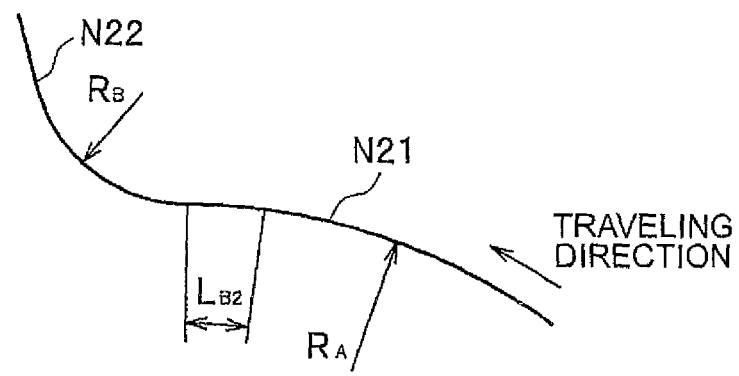
Figure 7B:
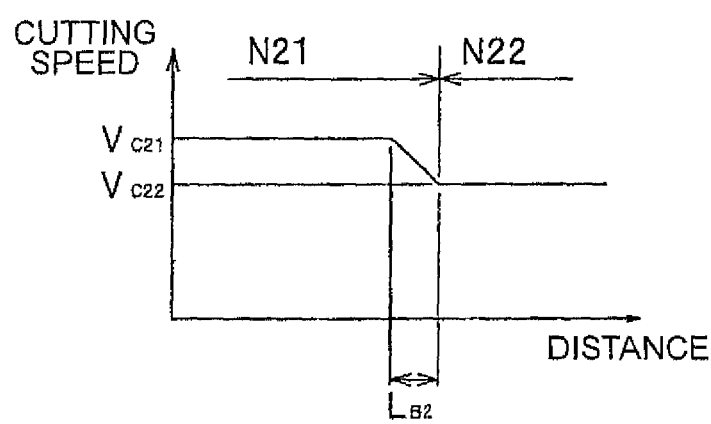
Figure 8A:
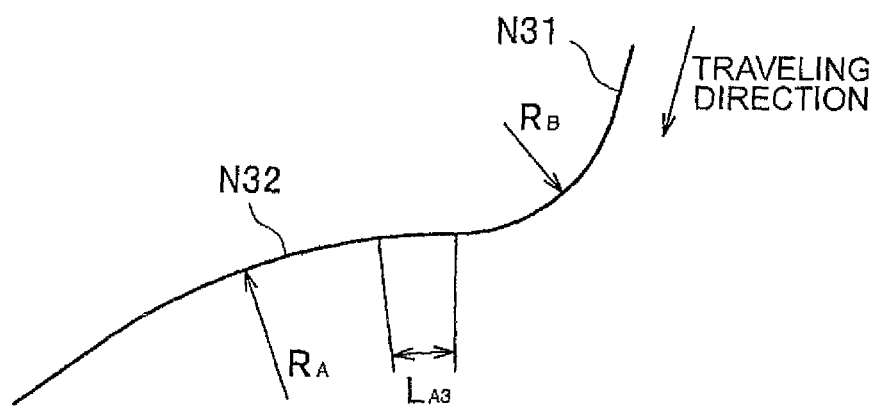

Here, when corner portions are continuously formed as shown in FIGS. 7A and 8A, lower speed takes precedence. Firstly, the case where corner cutting speed $V_{c21}$ in a previous block N21 is higher than corner cutting speed $V_{c22}$ in a subsequent block N22 will be described with reference to FIGS. 7A and 7B. In the previous block N21, the nozzle 4 initially moves at the corner cutting speed $V_{c21}$ corresponding to the previous block N21. Then the nozzle 4 slows down linearly with the before-corner acceleration from a before-corner acceleration distance $L_{B2}$ behind the subsequent block N22 along the path of the previous block N21.

Then the nozzle 4 enters the subsequent block N22 at the corner cutting speed $V_{c22}$ corresponding to the block N22 from the beginning. Here, if the distance along the path of the previous block N21 is shorter than the before-corner acceleration distance $L_{B2}$, the before-corner acceleration is performed from the block one block before the previous block N21.

Figure 8B:
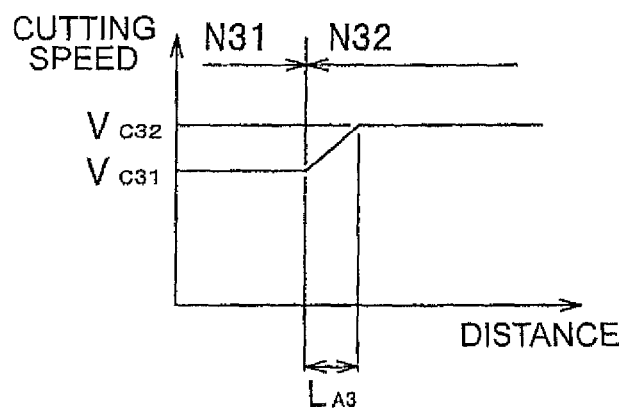

On the contrary, the case where corner cutting speed $V_{c31}$ corresponding to a previous block N31 is lower than corner cutting speed $V_{c32}$ corresponding to a subsequent block N32 will be described with reference to FIGS. 8A and 8B. In the previous block N31, the nozzle 4 completes movement at the corner cutting speed $V_{c31}$ corresponding to the previous block N31, and then, after entering the subsequent block N32, undergoes acceleration. The nozzle 4, after entering the subsequent block N32, speeds up with the before-corner acceleration along the path of the block N32. After cutting an after-corner acceleration distance $L_{A3}$ along the path of the block N32, the nozzle 4 moves at the corner cutting speed $V_{c32}$ corresponding to the subsequent block N32. These movements are applied also to the case where an acceleration section and a deceleration section are continuously formed.

<Creation of Position Command, Transmission, and Cutting>

The calculation unit 11 outputs a position command (data sequence), which corresponds to the cutting program with a cutting speed assigned to each block (path), to the servo amplifier of the movement mechanism 2 through the communication unit 13. Then the servo amplifier transmits a drive pulse to the servomotor on the basis of the position command received from the communication unit 13 and moves the movement mechanism 2. The nozzle 4 is moved by the movement mechanism 2 while directing, toward the workpiece W, water jets produced by mixing the high-pressure water supplied from the high-pressure water supply mechanism 6 with the abrasive supplied from the abrasive supply mechanism 7. The workpiece W is cut by the water jets.

As described above, in this embodiment, water jet cutting is performed by inputting a cutting program, a set cutting speed $V_p$, and cutting parameters including a material name and cutting quality; calculating a calculation cutting speed $V_{rv}$ matching the cutting quality on the basis of the cutting parameters; calculating a cutting shape from the cutting program; dividing the cutting shape into a linear portion and a corner portion; calculating a corner cutting speed $V_c$ for the corner portion within the range of from the calculation cutting speed $V_{rv}$ to the set cutting speed $V_p$ equal to or higher than the calculation cutting speed $V_{rv}$ on the basis of the shape of the corner portion; assigning the set cutting speed $V_p$ and the corner cutting speed $V_c$ to the linear portion and the corner portion, respectively, in the cutting program; and moving the nozzle 4 relative to the workpiece W on the basis of the cutting program assigned with the cutting speeds.

Therefore, according to this embodiment, the cutting shape is calculated from the cutting program, and an appropriate cutting speed corresponding to the shape of each corner portion of the cutting shape is assigned to the cutting program, and water jet cutting can be performed on the basis of the cutting program assigned with the cutting speed. Thus, a product matching the cutting quality without any uncut portion on the corner portion can be obtained. Further, since the cutting time depends on the input set cutting speed, if adjustment of the cutting time is desired, it is possible to easy obtain products which are the same in shape and different only in cutting time and cutting quality, from a single program by changing the input value of the set cutting speed.

That is, it is possible to automatically control cutting process in accordance with desired cutting quality so as to obtain a product without any uncut portion on a corner portion, and to also flexibly respond to a change in cutting speed.

Second Embodiment

<Taper Angle Control by Correcting Nozzle Attitude>

A second embodiment of the present invention will be described, in which the water jet cutting apparatus 100 according to the first embodiment further has the function of limiting the inclination angle of one of (a pair of) two cutting surfaces within a specified range by changing a nozzle attitude on the basis of the current cutting speed V, for controlling the inclination angle of the cutting surface to the thickness direction. It should be noted that in this embodiment, like reference signs are used for the same elements as in the first embodiment, and a detailed description thereof will not be repeated.

Figure 9:
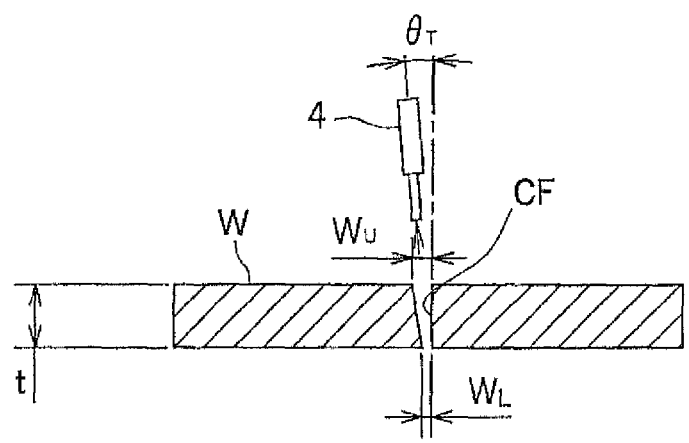
FIG. 9 is a sectional view of a cutting surface according to a second embodiment of the present invention.

With reference to FIG. 9, a sectional view of a cutting surface according to the second embodiment will be described. When the current cutting speed (current speed) V exceeds the optimum cutting speed $V_o$, the upper-surface cutting width $W_U$ becomes greater than the lower-surface cutting width $W_L$. On the contrary, when the current speed V is lower than the optimum cutting speed $V_o$, the upper-surface cutting width $W_U$ becomes smaller than the lower-surface cutting width $W_L$. At this time, cutting surfaces occur on both sides of a cut place, the two cutting surfaces being equally inclined with respect to the center axis of the nozzle 4 (see FIG. 5). However, it is possible to make one cutting surface CF of the two cutting surfaces substantially perpendicular by estimating a taper angle of the cutting surfaces and inclining the nozzle 4 by the taper angle $\theta_T$ of the cutting surfaces to a plane vertical to the traveling direction of the nozzle 4 (see FIG. 9). The present inventors have found that the taper angle of the cutting surfaces is defined by the above-described optimum cutting speed $V_o$, determined by the cutting parameters, etc. including the cutting material, and the current speed V. The water jet cutting apparatus 100 according to this embodiment eliminates inclination of one cutting surface CF of the two cutting surfaces by detecting current speed V using the detection mechanism 3 and automatically changing the attitude of the nozzle 4 in accordance with the detected current speed V.

Here, a method for determining which of the two cutting surfaces corresponds to the cutting surface whose inclination angle is to be kept within a specified range will be described. The cutting surface whose inclination angle is to be kept within a specified range corresponds to the cutting surface of the product obtained by cutting. In the cutting program, it is specified on which side, left or right, along the traveling direction the product-side cutting surface is present. As a method for specifying the product-side cutting surface, a code (for example, G41/G42 if it is the G code) for specifying the product-side cutting surface can be input.

Note that, at the time of calculation of a cutting shape, if it is a closed shape, its inside is recognized as the product side, and if it is not a closed shape, the product side can be set by specifying the positive and negative direction of each axis. Furthermore, a flag indicating which surface, left or right, in the traveling direction needs to be finished precisely may be input to the memory unit 12 through the input unit 15 in place of inputting the code in the cutting program.

Figure 10:
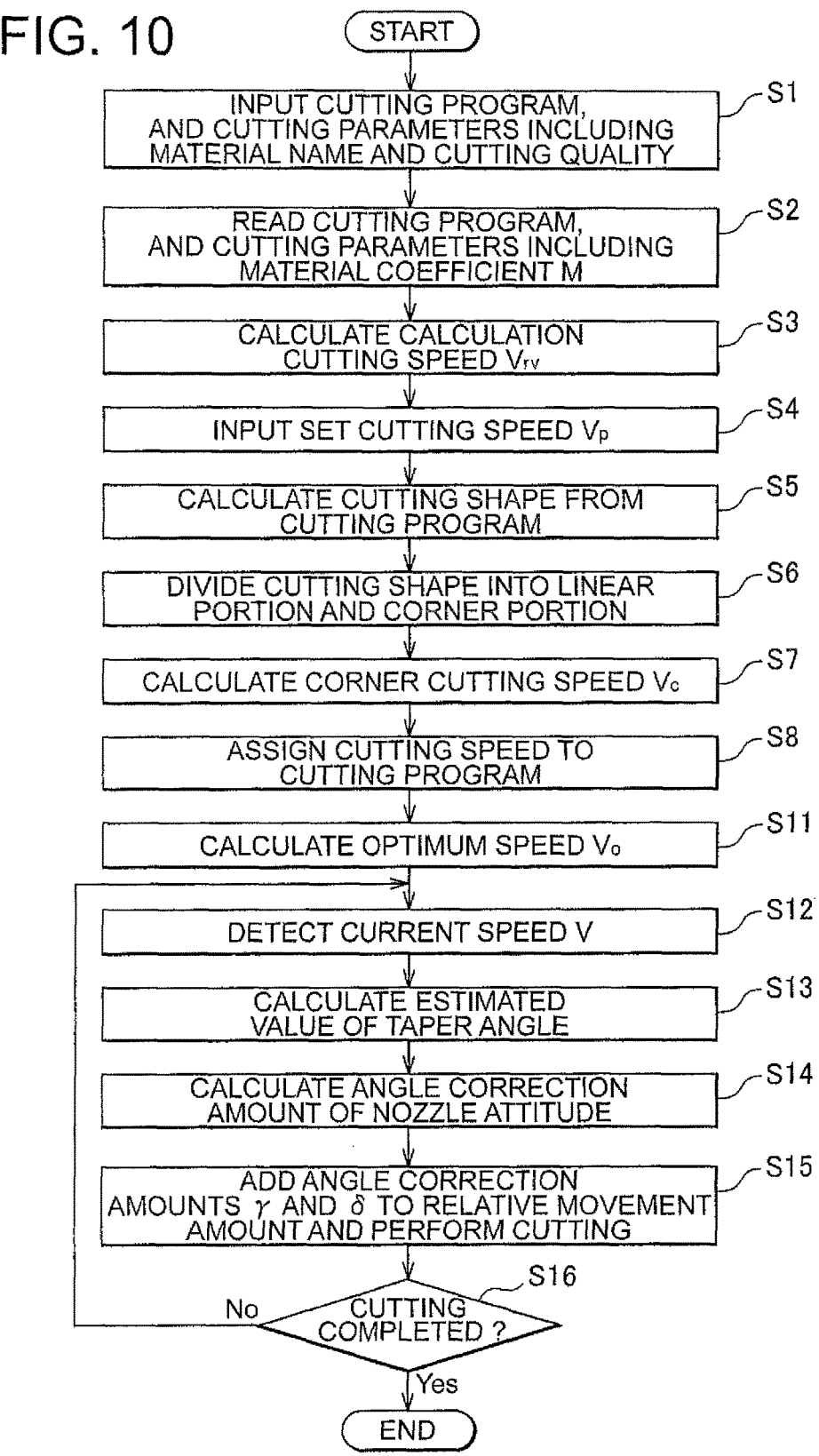
FIG. 10 is a flowchart for the procedure of a cutting method according to the second embodiment of the present invention.

The water jet cutting procedure according to this embodiment will be described with reference to FIG. 10. In FIG. 10, steps S1 to S8 are the same as the steps S1 to S8 in FIG. 4, and a detailed description thereof will not be repeated.

The calculation unit 11 calculates an optimum cutting speed $V_o$ on the basis of the read cutting parameters, material coefficient M and the like. (step S11). Here, the optimum cutting speed $V_o$ is the cutting speed at which the taper angle of the cutting surface becomes nearly zero (minimized), and in this embodiment, refers to the cutting speed corresponding to the cutting quality 1. The calculation unit 11 receives through the communication unit 13 the current speed V [m/s] detected by the detection mechanism 3 (step S12). Next, the calculation unit 11 calculates an estimated value (nozzle inclination angle) $\theta_T$ of the taper angle of the cutting surface on the basis of the cutting parameters and the received cutting speed V (step S13). Subsequently, the calculation unit 11 calculates an angle correction amount of the attitude of the nozzle 4 from the estimated value (nozzle inclination angle) $\theta_T$ of the taper angle and a traveling direction $\varphi_c$ calculated from the current speed V (step S14). Then the calculation unit 11 adds a position command correction value based on the angle correction amount to the position command value to be transmitted to the movement mechanism 2, and sends the obtained position command to the movement mechanism 2 through the communication unit 13. The movement mechanism 2 causes the nozzle 4 to move on the basis of the received position command and cut the workpiece W (step S15). The calculation unit 11 constantly monitors the current speed V through the detection mechanism 3 and performs interrupt control of the nozzle attitude continuously during execution of cutting. If the cutting of the workpiece W is not completed ("No" in step S16), the calculation unit 11 returns processing to the step S12, and, if the cutting of the workpiece W is completed ("Yes" in step S16), the cutting process shown in FIG. 10 ends.

Speed detection will be described with reference to FIG. 1.

The servomotor of each of the X, Y, and Z axes includes an encoder as the detection mechanism 3 for angle detection. The cutting speed of each axis is obtained by multiplying the rotational speed of the encoder by a ball screw pitch of the corresponding axis. The servo amplifier sends a signal corresponding to the cutting speed of the corresponding axis to the control device 1 through the communication unit 13. The calculation unit 11 calculates the current speed V by composing the cutting speed vectors of the axes.

It should be noted that a resolver or linear scale connected to a drive shaft may be used as the detection mechanism 3 in place of the encoder built into the servomotor of each axis.

Note that, when an articulated robot is used as the movement mechanism 2, the encoder built into the servomotor of each axis or the resolver included in each axis detects a rotational angle and an angular velocity. The speed of each axis is calculated by an inner product of a scalar quantity obtained by multiplying the angular velocity of the axis by the arm length of the axis and an angular component perpendicular to an arm angle, and the composition of speeds is calculated as the current speed V.

Figure 11:
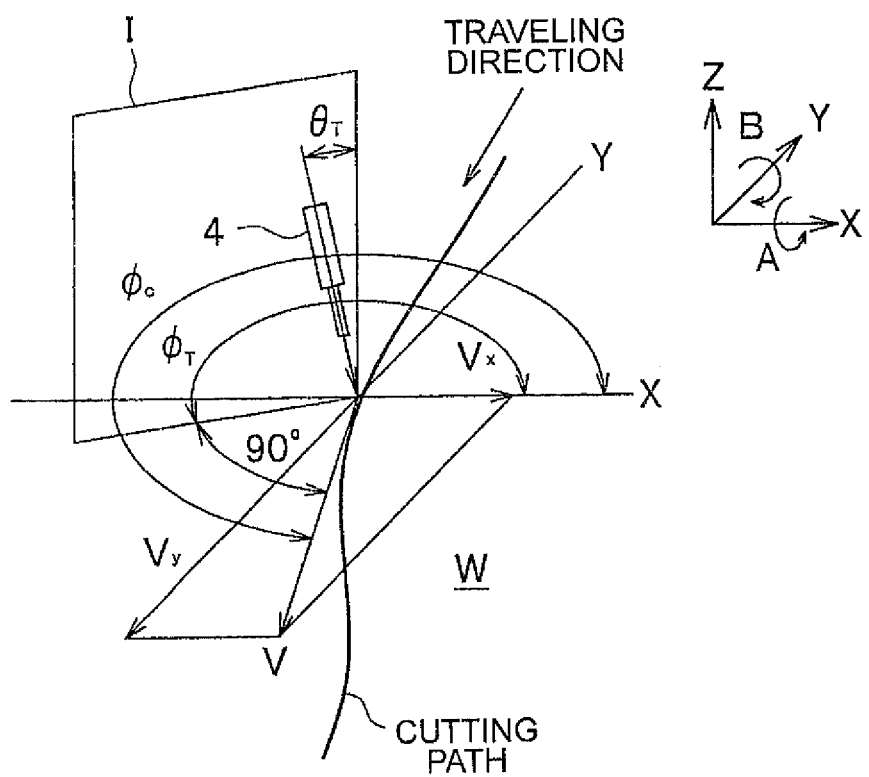
FIG. 11 shows an angle correction amount of a nozzle attitude, a cutting direction, and a nozzle inclination angle according to the second embodiment of the present invention.

The calculation of the angle correction amount of the nozzle attitude will be described with reference to FIG. 11. The estimated value of the taper angle of the cutting surface is used for calculating the nozzle inclination angle $\theta_T$. The nozzle inclination angle $\theta_T$ is calculated by the following equation (2), where t represents a cutting thickness of the workpiece W; V, a current cutting speed; and $V_o$, an optimum cutting speed. Here, θ is a specified taper angle. When the specified taper angle θ is set to 0°, the inclination of the product-side cutting surface can be eliminated.

[FORMULA 2]

$$\theta_T = \theta + \tan^{-1}\left[f(t)ln\left(\frac{V}{V_0}\right)\right] \quad (2)$$

The cutting direction (direction of the relative movement (travel) of the nozzle 4 to the workpiece W) $\varphi_c$ is calculated by the following equation (3), where $V_x$ and $V_y$ represent an X-axis component and a Y-axis component, respectively, of the actual cutting speed V.

[FORMULA 3]

$$\emptyset_c = \tan^{-1}\left(\frac{V_y}{V_x}\right) \quad (3)$$

A nozzle inclination direction $\varphi_T$ [°] includes a vertical direction and refers to the inclination of a plane I vertical to the cutting direction with respect to an XY plane. With the nozzle 4 always inclined at the nozzle inclination angle $\theta_T$ on the plane I, cutting of the workpiece W is performed. The nozzle inclination direction $\varphi_T$ is switched depending on which cutting surface, left or right, in the traveling direction for cutting is to be finished precisely. When a necessary member after cutting is on the left side in the traveling direction and the left-hand cutting surface needs to be finished precisely, the nozzle inclination direction $\varphi_T$ is given by the following equation (4). On the other hand, when a necessary member after cutting is on the right side in the traveling direction and the right-hand cutting surface needs to be finished precisely, the nozzle inclination direction $\varphi_T$ is given by the following equation (5).

[FORMULA 4]

$$\emptyset_T = \emptyset_c - 90 \quad (4)$$

[FORMULA 5]

$$\emptyset_T = \emptyset_0 + 90 \quad (5)$$

At this time, an A-axis angle correction amount γ is obtained by the following equation (6), and a B-axis angle correction amount δ is obtained by the following equation (7).

[FORMULA 6]

$$\gamma = \sin^{-1}(\sin\emptyset_T \times \sin\theta_T) \quad (6)$$

[FORMULA 7]

$$\delta = \sin^{-1}\left[\frac{\cos\emptyset_T \times \sin\theta_T}{\cos\{\sin^{-1}(\sin\emptyset_T \times \sin\theta_T)\}}\right] \quad (7)$$

<Creation of Position Command, Transmission, and Cutting>

The calculation unit 11 outputs a position command (pulse sequence) to be sent to the servo amplifier of the movement mechanism 2 in accordance with a cutting speed assigned to each block (path) in the cutting program. At this time, the calculation unit 11 continually calculates position command correction amounts corresponding to the angle correction amounts γ and δ calculated on the basis of the current speed V, material coefficient M, and cutting parameters and incorporates the calculation results into the position command created by the cutting program to create a position command to be output.

The communication unit 13 outputs the corrected position command to the servo amplifier. Then the servo amplifier sends a drive pulse to the servomotor on the basis of the position command received from the communication unit 13, thereby moving the movement mechanism 2. The actual amount of movement of the movement mechanism 2 and the cutting speed V are detected by the detection mechanism 3 to be sent to the servo amplifier.

The nozzle 4 is moved by the movement mechanism 2 on the basis of the position command created by the calculation unit 11. This action causes the nozzle 4 to move while taking into account the acceleration in the vicinity of the corner portion and the angle correction amount, responding to the input cutting program and set cutting speed $V_p$, and undergoing automatic angle correction processing of the nozzle attitude. Thus, the angle of inclination of one (product-side) cutting surface of both cutting surfaces falls within the specified value, and a finished piece (product) of a predetermined cutting shape is obtained.

As described above, according to this embodiment, inclination of the product-side cutting surface can be eliminated by estimating a taper angle of the pair of cutting surfaces under the current cutting speed V and inclining the nozzle 4 in accordance with the estimated taper angle. Here, the nozzle 4 is always kept in the optimum attitude regardless of the input set cutting speed $V_p$ and cutting shape, thereby eliminating the inclination of one (product-side) cutting surface of the two cutting surfaces occurring at the time of cutting the workpiece W.

Furthermore, the inclination angle of the product-side cutting surface is kept in a specified range by inclining the nozzle 4, thereby allowing cutting at a higher cutting speed, as compared with the speed for keeping the taper angle of the pair of cutting surfaces within a certain range without inclining the nozzle 4.

It should be noted that although the above-described embodiments are in terms of the cutting program for performing XY two-dimensional movement, the cutting program may include operation for XYZ three-dimensional movement and movement in the direction of each of the X, Y, Z, A, and B axes. In this case, it is possible to incline the nozzle 4 with respect to the traveling direction on the assumption that the direction of the center axis of the nozzle 4 defined by the indication angles of the A and B axes is a virtually vertical direction.

It should be noted that the movement mechanism 2 has an X-, Y-, Z-, A-, and B-axis configuration, but alternatively can have the X-, Y-, Z-, A-, and C-axis configuration or the X-, Y-, Z-, B-, and C-axis configuration. The angle to be assigned to each axis is changed as appropriate depending on the axis configuration. It should be noted that, in some axis configurations, the nozzle 4 might be not inclined even when the angle of the C-axis is changed. In this case, the so-called normal direction control for setting the C-axis along the traveling direction in accordance with the cutting shape is performed so that the angle (attitude) of the nozzle 4 is always controllable.

What is claimed is:

1. A water jet cutting method in which a water jet mixed with abrasive is jetted from a nozzle and the nozzle is moved relative to a workpiece to cut the workpiece, comprising the steps of:
inputting a cutting program as a program for cutting process, a set cutting speed, and cutting parameters including material information of the workpiece and cutting quality;
calculating a calculation cutting speed as a cutting speed matching the cutting quality on the basis of the cutting parameters;
calculating a cutting shape from the cutting program and dividing the cutting shape into a linear portion and a corner portion;
calculating a corner cutting speed for the corner portion on the basis of a shape of the corner portion within a range of from the calculation cutting speed to the set cutting speed, the set cutting speed being equal to or higher than the calculation cutting speed;
performing assignment processing for assigning the set cutting speed and the corner cutting speed as command cutting speeds to the linear portion and the corner portion, respectively, in the cutting program; and
moving the nozzle relative to the workpiece on the basis of the cutting program assigned with the command cutting speeds,
wherein said cutting quality includes information about an inclination angle of a product-side cutting surface of a pair of cutting surfaces of the workpiece after cutting, the method further comprising the steps of:
detecting a cutting speed as a speed of relative movement of the nozzle to the workpiece;
estimating a taper angle of the pair of cutting surfaces on the basis of the detected cutting speed, the calculation cutting speed for minimizing the taper angle of the pair of cutting surfaces of the workpiece after cutting, and the cutting parameters; and
calculating an angle correction amount of a nozzle attitude, based on the estimated tapper angle, for keeping the inclination angle of the product-side cutting surface of the pair of cutting surfaces of the workpiece within a specified range,
wherein the angle correction amount is added to the amount of relative movement of the nozzle to the workpiece based on the cutting program to move the nozzle relative to the workpiece.

2. The water jet cutting method according to claim 1, wherein the material information of the workpiece is a material name and,
from a material table with a material coefficient corresponding to each material name recorded, a value of the material coefficient corresponding to the input material name is retrieved and read to be used for calculation of the calculation cutting speed.

3. The water jet cutting method according to claim 1, wherein a certain number of blocks ahead of a block currently being executed in the cutting program are read and the assignment processing is performed sequentially for each of the read blocks.

4. The water jet cutting method according to claim 1, wherein processing for changing the set cutting speed to the same value as the calculation cutting speed is performed.

5. The water jet cutting method according to claim 1, wherein the taper angle of the cutting surfaces is defined by an optimum cutting speed, determined by the cutting parameters including the cutting material, and a current speed.

6. A water jet cutting apparatus comprising:
a movement mechanism that relatively moves a nozzle and a workpiece;
a high-pressure water supply mechanism that supplies high-pressure water to the nozzle;
an abrasive supply mechanism that supplies abrasive to the nozzle; and
a control device for the movement mechanism, wherein
the movement mechanism moves on the basis of a position command received from the control device, and
the controller includes:
an input unit for inputting a cutting program as a program for cutting process, a set cutting speed, and cutting parameters including material information of the workpiece and cutting quality;
a memory unit that stores the cutting program, a calculation program for determining a cutting speed as a speed of relative movement of the nozzle to the workpiece, and a cutting program assigned with the cutting speed,
a calculation unit that stores the cutting parameters in the memory unit; calculates the calculation cutting speed as a cutting speed matching the cutting quality on the basis of the cutting parameters; calculates a cutting shape from the cutting program; dividing the cutting shape into a linear portion and a corner portion; calculates a corner cutting speed for the corner portion on the basis of a shape of the corner portion within a range of from the calculation cutting speed to the set cutting speed, the set cutting speed being equal to or higher than the calculation cutting speed; assigns the set cutting speed and the corner cutting speed as command cutting speeds to the linear portion and the corner portion, respectively, in the cutting program; and creates the position command on the basis of the cutting program assigned with the command cutting speeds; and
a communication unit that sends the position command to the movement mechanism,
wherein:
said cutting quality includes information about an inclination angle of a product-side cutting surface of a pair of cutting surfaces of the workpiece after cutting;
the movement mechanism further includes a detection mechanism that detects a cutting speed as a speed of relative movement of the nozzle to the workpiece;
the communication unit receives the cutting speed; and
the calculation unit estimates a taper angle of the pair of cutting surfaces on the basis of the received cutting speed, the calculation cutting speed for minimizing the taper angle of the pair of cutting surfaces of the workpiece after cutting, and the cutting parameters; calculates an angle correction amount of a nozzle attitude, based on the estimated tapper angle, for keeping the inclination angle of the product-side cutting surface of the pair of cutting surfaces of the workpiece within a specified range; calculates a position command correction amount corresponding to the angle correction amount; and incorporates the position command correction amount into the position command.

7. The water jet cutting apparatus according to claim 6, wherein:
the material information of the workpiece is a material name;
the memory unit stores a material table with a material coefficient corresponding to each material name recorded; and the calculation unit retrieves and reads a value of the material coefficient corresponding to the input material name from the material table, and uses the value for calculation of the calculation cutting speed.

8. The water jet cutting apparatus according to claim 6, wherein the calculation unit performs processing for changing the set cutting speed to the same value as the calculation cutting speed.

9. The water jet cutting apparatus according to claim 6, wherein the taper angle of the cutting surfaces is defined by an optimum cutting speed, determined by the cutting parameters including the cutting material, and a current speed.

\* \* \* \* \*